(12) United States Patent
Nishida

(10) Patent No.: US 9,519,253 B2
(45) Date of Patent: Dec. 13, 2016

(54) ELECTRIC POWER SUPPLY DEVICE AND IMAGE FORMING APPARATUS

(71) Applicant: CANON KABUSHIKI KAISHA, Tokyo (JP)

(72) Inventor: Yuya Nishida, Mishima (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/863,776

(22) Filed: Sep. 24, 2015

(65) Prior Publication Data
US 2016/0091849 A1 Mar. 31, 2016

(30) Foreign Application Priority Data
Sep. 26, 2014 (JP) .................................. 2014-197108

(51) Int. Cl.
| | |
|---|---|
| G03G 15/20 | (2006.01) |
| H02M 1/08 | (2006.01) |
| G03G 15/00 | (2006.01) |
| H02M 1/32 | (2007.01) |
| H02M 1/36 | (2007.01) |
| H02M 5/257 | (2006.01) |
| H02M 1/00 | (2006.01) |

(52) U.S. Cl.
CPC ......... *G03G 15/5004* (2013.01); *H02M 1/083* (2013.01); *H02M 1/32* (2013.01); *H02M 1/36* (2013.01); *H02M 5/2573* (2013.01); *H02M 2001/0032* (2013.01)

(58) Field of Classification Search
CPC .............................. G03G 15/80; G03G 21/1867
See application file for complete search history.

(56) References Cited

U.S. PATENT DOCUMENTS

| | | | |
|---|---|---|---|
| 2006/0021098 A1* | 1/2006 | Tezuka ................. | H01H 47/002 477/7 |
| 2011/0274450 A1* | 11/2011 | Atarashi .............. | G03G 15/205 399/37 |
| 2014/0003832 A1* | 1/2014 | Atarashi ............ | G03G 15/5004 399/88 |

FOREIGN PATENT DOCUMENTS

| | | | |
|---|---|---|---|
| JP | 2009168404 A | * | 7/2009 |
| JP | 2012-42573 A | | 3/2012 |

* cited by examiner

*Primary Examiner* — Minh Phan
*Assistant Examiner* — Victor Verbitsky
(74) *Attorney, Agent, or Firm* — Fitzpatrick, Cella, Harper & Scinto

(57) ABSTRACT

An electric power supply device for supplying electric power to a load, the electric power supply device includes a first relay connected with a live line of an AC voltage source; a second relay connected with a neutral line of the AC voltage source; a controller for executing a starting sequence for rendering On the first relay and the second relay from Off state; and a storing portion for storing information relating to the starting sequence executed by the controller; wherein when the electric power supply device is actuated, the controller switches the starting sequence on the basis of the information stored in the storing portion.

7 Claims, 10 Drawing Sheets

ELECTRIC POWER SUPPLY DEVICE AND IMAGE FORMING APPARATUS

FIELD OF THE INVENTION AND RELATED ART

The present invention relates to an electric power supply device and an image forming apparatus, more particularly to the electric power supply device suitable for a control for a fixing device used with an image forming apparatus such as an electrophotographic copying machine, an electrophotographic printer or the like.

In the electric power supply device for supplying electric power to a heating apparatus provided in the fixing device used with the image forming apparatus, an electromagnetic relay device (relay) force shutting off the electric power supply to the heating apparatus is widely used. For such an electric power supply device, a safety circuit including a relay in live and neutral electric power lines of an AC voltage source is widely used, as disclosed in Japanese Laid-open Patent Application 2012-042573, for example.

However, with the safety circuit including the relay in the electric power line of the AC voltage source, an inrush current flows to the load with the result of production of arc discharge at the contacts of the relay each time of the closing operation of the relay. In the rotational control system, a frequency of the arc discharge productions in one relay is relatively larger, and therefore, it is desired to extend the long service life of the relay and the voltage supply device.

SUMMARY OF THE INVENTION

It is another object of the present invention to provide an electric power supply device and an image forming apparatus in which the frequency of the arc discharge productions at the contacts of a relay is reduced, thereby to increase the service life of the relay.

According to an aspect of the present invention, there is provided an electric power supply device for supplying electric power to a load, said electric power supply device comprising at least one first relay connected with a live line of an AC voltage source; at least second relay connected with a neutral line of the AC voltage source; a controller for executing a starting sequence for rendering On said first relay and said second relay from Off state; and a storing portion for storing information relating to the starting sequence executed by said controller; wherein when said electric power supply device is actuated, said controller switches said starting sequence on the basis of the information stored in said storing portion.

According to another aspect of the present invention, there is provided an electric power supply device for supplying electric power to a load, said electric power supply device comprising at least one first relay connected with a live line of an AC voltage source; at least second relay connected with a neutral line of the AC voltage source; a controller for executing a stopping sequence for rendering Off said first relay and said second relay from On state; and a storing portion for storing information relating to the stopping sequence executed by said controller; wherein when said electric power supply device is stopped, said controller switches said stopping sequence on the basis of the information stored in said storing portion.

According to a further aspect of the present invention, there is provided an image forming apparatus comprising an image forming station for forming an image on a recording sheet; a fixing portion for fixing the image formed on the recording sheet by said image forming station on the recording sheet; an electric power supply device for supplying electric power to said fixing portion; said electric power supply device including, at least one first relay connected with a live line of an AC voltage source, at least second relay connected with a neutral line of the AC voltage source; a controller for executing a starting sequence for rendering On said first relay and said second relay from Off state; and a storing portion for storing information relating to the starting sequence executed by said controller; wherein when said electric power supply device is actuated, said controller switches said starting sequence on the basis of the information stored in said storing portion.

According to a further aspect of the present invention, there is provided an image forming apparatus comprising an image forming station for forming an image on a recording sheet; a fixing portion for fixing the image formed on the recording sheet by said image forming station on the recording sheet; an electric power supply device for supplying electric power to said fixing portion; said electric power supply device including, at least one first relay connected with a live line of an AC voltage source; at least second relay connected with a neutral line of the AC voltage source; a controller for executing a stopping; sequence for rendering Off said first relay and said second relay from On state; and a storing portion for storing information relating to the stopping sequence executed by said controller; wherein when said electric power supply device is stopped, said controller switches said stopping sequence on the basis of the information stored in said storing portion.

Further features of the present invention will become apparent from the following description of exemplary embodiments with reference to the attached drawings.

DESCRIPTION OF THE EMBODIMENTS

[Image Forming Apparatus]

Figure 1:
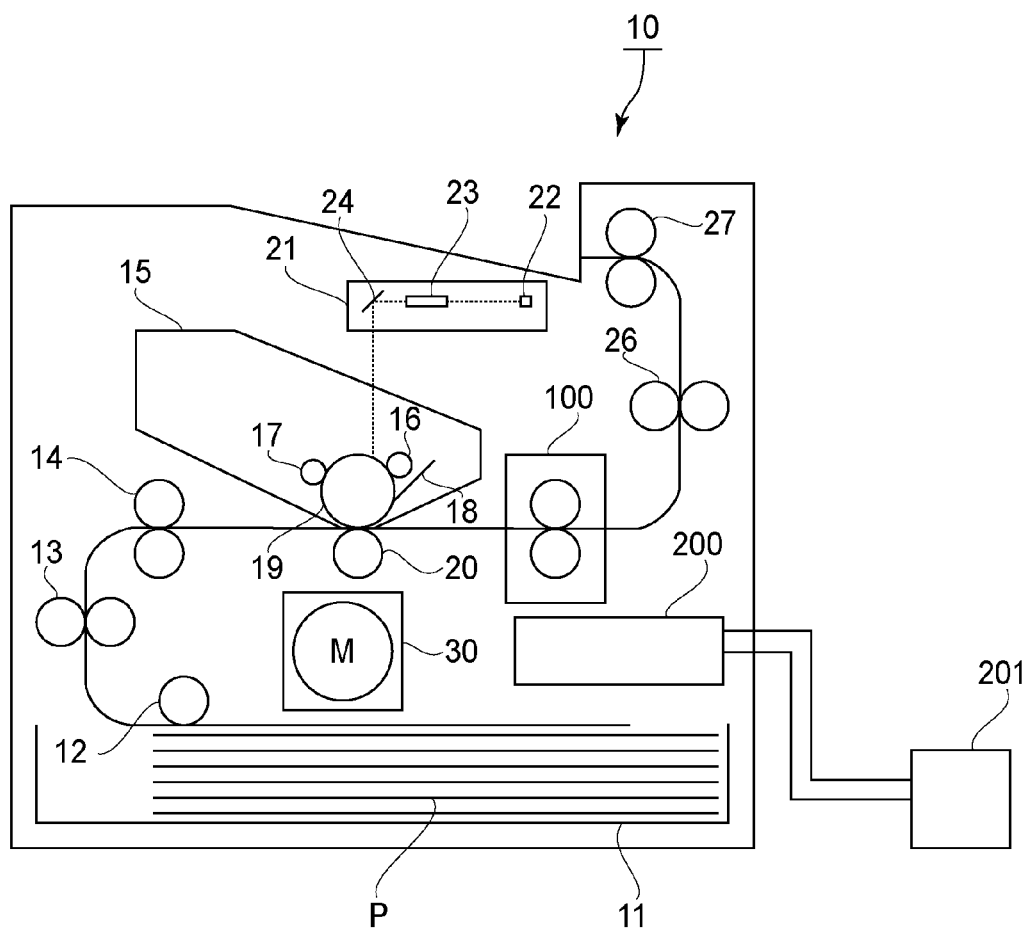
FIG. 1 is a schematic view of an image forming apparatus according to Embodiments 1 and 2 of the present invention.

FIG. 1 is a sectional view of an image forming apparatus 10 of an electrophotographic type. A recording sheet P which is a recording material stacked in a sheet feeding cassette 11 is singled out by a pick-up roller 12. The recording sheet is it toward the registration rollers 14 by the sheet feeding roller 13. The recording sheet P is fed to a process cartridge 15 at predetermined timing by the registration rollers 14. The process cartridge 15 includes as a unit a charging roller 16 as charging means, a developing roller 17 as developing means, a cleaner 18 as cleaning means and a photosensitive drum 19 which is an electrophotographic photosensitive member. The process cartridge 15 forms a toner image (unfixed) on the recording sheet through a series of known electrophotographic process.

The photosensitive drum 19 is uniformly charged electrically at the surface thereof by the charging roller 16, and thereafter, it is exposed to image light in accordance with an image signal by a scanner unit 21 as image exposure means. A laser beam emitted from a laser diode 22 provided in the scanner unit 21 scans the surface of the photosensitive drum in a main scan direction by a rotatable polygonal mirror 23 and a reflection mirror 24. The main scan direction is the direction in which the laser beam scans the surface of the photosensitive drum 19 by the rotation of the rotatable polygonal mirror, and it is a rotational axial direction of the photosensitive drum 19. The laser beam scans in effect in the sub-scan direction by the rotation of the photosensitive drum 19, so that a two-dimensional electrostatic latent image is formed on the surface of the photosensitive drum 19. The sub-scan direction is the direction perpendicular to the main scan direction, and it is a rotational moving direction of the photosensitive drum 19.

The electrostatic latent image formed on the photosensitive drum 19 is visualized into a toner image by the developing roller 17. The toner image on the photosensitive drum 19 is transferred onto the recording sheet said from the registration rollers 14 by a transfer roller 20. Subsequently, when the recording sheet P now having the transferred toner image is fed to a fixing device 100, the recording sheet P is subjected to heat pressing process by a heating portion and a pressing portion in the fixing device 100, so that the toner image on the recording sheet P is fixed thereon. The recording sheet P is discharged to an outside of the image forming apparatus 10 by middle sheet discharging rollers 26 and sheet discharging rollers 27, by which the series of printing operation is completed. A motor 30 supplies driving forces to units including the fixing device 100.

[Fixing Device]

The fixing device 100 carries out electric power control including a phase control, a wave number control or a phase control waveform using a plurality of cyclic periods, on the basis of a reference (zero-cross) in a phase control for the electric power supplied from the AC voltage source, as will be described hereinafter. The image forming apparatus 10 is provided with an electric power supply device 200. The electric power supply device 200 is connected with an AC voltage source 201 which is commercial voltage source or the like.

[Embodiment 1]
[Electric Power Supply Device]

Figure 2:
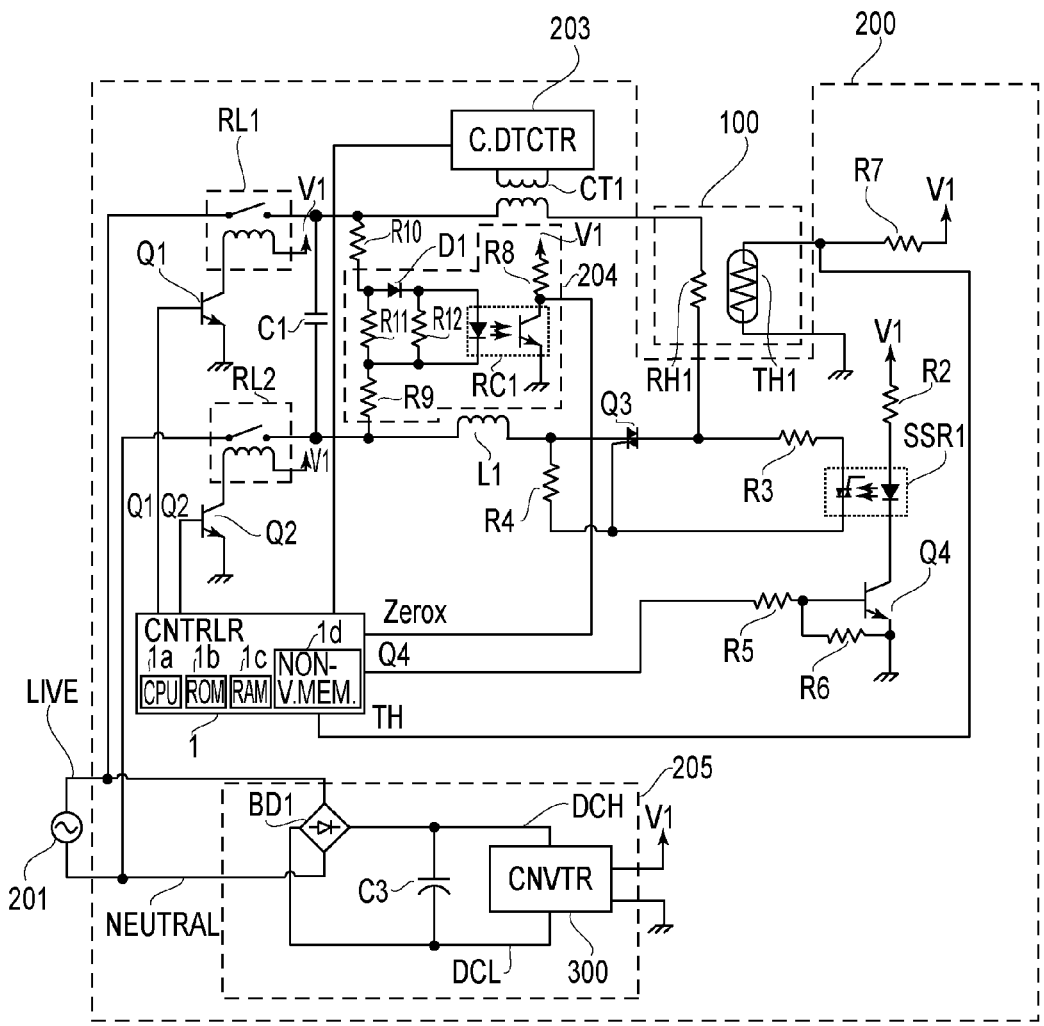
FIG. 2 is a circuit diagram of an electric power supply device according to Embodiment 1.

FIG. 2 is a circuit diagram of the electric power supply device 200 according to Embodiment 1. The electric power supply device 200 supplies the electric power to the electric equipment electric equipment of the image forming apparatus 10 including a heat generating resistor (heater) RH1 as a heating apparatus inside the fixing device 100. In this embodiment, the heater RH1 is the load device. The AC voltage source outputs an AC voltage between a live (LIVE) Line and a neutral (NEUTRAL) line of a transmission line to supply the AC voltage to the electric power supply device 200. A voltage source portion 205 of the electric power supply device 200 carries out full wave rectification of the AC voltage supplied from the AC voltage source 201 by a bridge diode BD 1 and then carries out smoothing using a capacitor C3. A low side potential of the output of the capacitor C3 is DCL, and a high side potential is DCH. A converter 300 is an insulation type DC/DC converter and receives a voltage charged in the capacitor C3 at the primary side and outputs a predetermined DC voltage at a secondary side. The converter 300 includes a transformer (unshown) insulating between the primary side and the secondary side, and the transformer includes a primary winding line, a secondary winding line and an assistance winding line. The converter 300 outputs an assistance winding line voltage V2 supplied from the assistance winding line (unshown) to the primary side.

(Relay)

Relays are connected in the live line and the neutral line of the AC voltage source 201, respectively. More specifically, in the live line of the AC voltage source a relay RL1 as a first relay is connected, and in the neutral line of the AC voltage source 201, a relay RL2 as a second relay is connected. The electric power supply device 200 includes a transistor Q1 and a transistor Q2 as driving circuits for the relay RL1 and the relay RL2, and the relay controlling means for the relay RL1 and the relay RL2. The transistor Q1 includes a base contact connected with a controller 1 which will be described hereinafter, a collector contact connected with the relay RL1, and an emitter contact which is grounded. The transistor Q2 includes a base contact connected with a controller 1 which will be described hereinafter, a collector contact connected with the relay RL2, and an emitter contact which is grounded.

In addition, the electric power supply device 200 is provided with a controller 1 as processing control means for controlling the driving circuit. The controller 1 includes CPU1$a$, ROM 1$b$, RAM 1$c$ and non-volatile memory 1$d$. The CPU1$a$ controls various parts of the electric power supply device 200 in accordance with various programs stored in the ROM 1$b$, using the RAM 1$c$ as a work area. The CPU1$a$ is capable of storing various information in the non-volatile memory 1$d$ as storing means capable of keeping the information even after the electric power supply is shut off.

When the controller 1 outputs a high-level Q1 driving signal, a current flows into the base contact of the transistor Q1, so that the transistor Q1 is rendered On. As a result of the on-state of the transistor Q1, a DC voltage which is the secondary side voltage of the voltage source supplied from the converter 300 is applied to the secondary side coil of the relay RL1. By this, the primary side contact of the relay RL1 is closed. When the controller 1 outputs a low-level Q1 driving signal, the current to the base contact of the transistor Q1 stops, so that the transistor Q1 is rendered Off. By this, the DC voltage V1 is not applied to the secondary side of the relay RL1, so that no current flows. By this, the primary side contact of the relay RL1 is opened. Similarly, the relay RL2 is controlled by controlling the transistor Q2 by the Q2 driving signal outputted by the controller 1.

The controller 1 stores in the non-volatile memory 1$d$ a hysteresis as to which control sequence of the relay RL1 and the relay RL2 is carried out. The controller 1 also functions as a selecting means for determining selection of the control sequence. In addition, the controller 1 also functions as electric power control means for controlling bi-directional thyristor Q3 which will be described hereinafter, and also controls the image forming apparatus 10 having been described in conjunction with FIG. 1. The details of the relay control by the controller 1 will be described hereinafter.

Between the transmission lines of the AC voltage source 201, across-the-line capacitor (X capacitor) C1 is connected. By the connection of the X capacitor C1 in this manner, the relay RL1 and the relay RL2 are rendered Off to shut off the path to the X capacitor C1 in the state that the electric power supply to the image forming apparatus 10 is off (non-conduction with voltage source). In addition, since the image forming operation (printing operation) or the like of the image forming apparatus 10 is not carried out, the path to the X capacitor C1 can be shut off in the non-conduction states of the relay RL1 and the relay RL2, even in a sleeping state. Here, the sleeping state is a low electric energy consumption state in which the electric energy consumption is low as compared with the printing state. By the shutting off of the path to the X capacitor C1, the electric energy consumption of the X capacitor C1 can be reduced.

(Current Detection Circuit)

A current transformer CT1 and current detection circuit 203 as state detecting means for detecting a current between the transmission lines for the relay RL1 and the relay RL2 functions as current detection means for detecting the current flowing into the heater RH1 from the AC voltage source 201. An operation of the current transformer CT1 and the current detection circuit 203 will be described. In the current transformer CT1, the current corresponding to the current through the primary side winding line flows in the secondary side winding line. The current detection circuit 203 detects the current generated in the secondary side winding line of the current transformer CT1 and outputs the detected current to the controller 1. As will be described hereinafter, in this embodiment, the current transformer CT1 and current detection circuit 203 functions as failure detecting means for the relay RL1 and the relay RL2.

(Zero-Cross Detection Circuit)

A zero-cross detection circuit 204 is zero-cross detecting means for the AC voltage source 201. The operation of the zero-cross detection circuit 204 will be described. When the potential of the neutral line supplied from the AC voltage source 201 is lower than the potential of the live line, current flows from the live line toward the neutral line to the zero-cross detection circuit 204 through a resistor R10. The current supplied from the resistor R10 flows into a primary side diode of a photo-coupler PC1 through a diode D1. The current flowing into the primary side diode of the photo-coupler PC1 flows to the neutral line through the resistor R9.

When the current flows through the primary side diode of the photo-coupler PC1, the secondary side transistor of the photocoupler is rendered On. The resistor R12 is a malfunction prevention resistor for the photo-coupler PC1. When the secondary side transistor of the photo-coupler PC1 is rendered On, the voltage of a zero-cross signal (Zero-cross) becomes low. The voltage of the zero-cross signal is a potential at a connection point between the resistor R8 and the collector contact of the secondary side transistor of the photo-coupler PC1, and the zero-cross signal is outputted to the controller 1. The controller 1 detects a falling edge of the inputted zero-cross signal falling from the high-level to the low-level.

When the potential of the neutral line is higher than the potential of the live line, the current flows from the neutral line toward the live line through the resistor R9, the resistor R11 and the resistor R10. Therefore, no current flows in the primary side diode of the photo-coupler PC1. By this, the secondary side transistor of the photo-coupler PC1 is rendered Off. Then, the zero-cross signal becomes high because it is pulled up to the DC voltage V1 through the resistor R8. The controller 1 detects a rising edge of the zero-cross signal rising from the low-level to the high-level.

(Electric Power Supply to Heater)

The bi-directional thyristor (TRIAC) Q3 is electric power supplying means to the heater RH1. A driving method for the TRIAC Q3 will be described. Resistors R3 and R4 are resistances for driving the TRIAC Q3, and a photo-TRIAC coupler SSR1 is an element for assuring a creeping distance between the primary and secondary sides. A transistor Q4 includes a base contact connected with the controller 1, a collector contact connected with a cathode contact of the secondary side diode of the photo-TRIAC coupler SSR1, and an emitter contact which is grounded.

By the controller 1 makes the Q4 driving signal to the high-level, the current flows into the base contact of the transistor Q4 through the resistor R5, so that the transistor Q4 is rendered On. By this, the current flows through the secondary side diode of the photo-TRIAC coupler SSR1 from the DC voltage V1 through the resistor R2, so that the primary side TRIAC of the photo-TRIAC coupler SSR1 is rendered On. The resistor R6 is a resistance between the base and the emitter of the transistor Q4. When the primary side TRIAC of the photo-TRIAC coupler SSR1 is rendered On, the TRIAC Q3 is rendered On, so that the electric power is supplied from the electric power supply device 200 to the heater RH1.

By the controller 1 makes the Q4 driving signal to the low-level, the current to the base contact of the transistor Q4 is shut off, so that the transistor Q4 becomes rendered Off. By this, no current flows through the secondary side diode of the photo-TRIAC coupler SSR1, so that the primary side TRIAC of the photo-TRIAC coupler SSR1 is rendered Off. When the primary side TRIAC of the photo-TRIAC coupler SSR1 is rendered Off, the TRIAC Q3 is rendered Off, so that the electric power supply from the electric power supply device 200 to the heater RH1 is shut off. A coil L1 is an element for suppressing normal noise of the transmission paths to the heater RH1.

(Sleeping State)

The sleeping state which is low electric energy consumption when the printing operation or the like is not carried out. When the image forming apparatus 10 is in the sleeping state, the relay RL1 and the relay RL2 are in the Off-state. Because the relay RL1 and the relay RL2 are in the Off-states, no current flows to the primary side of the zero-cross detection and to the X capacitor C1, and therefore, the electric energy consumption by the electric power supply device 200 can be suppressed. In the sleeping state, the secondary side transistor of the photo-coupler PC1 is always in the Off-state, and therefore, the zero-cross signal is always at the high-level.

(Stand-by State)

A circuit operation in the stand-by state which is ready for immediate printing operation or the like will be described. When a printing command is produced by the user, the controller 1 renders the relay RL1 and the relay RL2 On. In the stand-by state, the electric power is supplied to the zero-cross detection circuit 204 and the X capacitor C1, and therefore, the electric energy consumption of the electric power supply device 200 is large.

(Printing State)

The circuit operation in the printing state in which the printing operation is carried out will be described. In response to the printing command by the user, the controller 1 shifts the state from the stand-by state waiting for the printing command to the printing state. The relay RL1 and the relay RL2 are in the On-state. Therefore, photo-coupler PC1 repeats on and off in accordance with the supplied AC voltage, and the zero-cross signal outputted from the zero-cross detection circuit 204 repeats the high-level and the low-level. In the printing state, the controller 1 controls the TRIAC Q3 to control the electric power supplied to the heater RH1, and the printing operation is carried out.

The control for the TRIAC Q3 by the controller 1 will be described. The controller 1 controls the electric power supplied to the heater RH1 on the basis of the temperature of the heater RH1, the current flowing through the heater RH1 and the zero-cross of the AC voltage source using the TRIAC Q3. The temperature of the heater RH1 is detected by a thermister TH1. The current flowing through the heater RH1 is detected by the current detection circuit 203. The zero-cross of the AC voltage source 201 is detected by the zero-cross detection circuit 204.

As for the temperature of the heater RH1 detected by the thermister TH1 k a partial voltage by the thermister TH1 and the resistor R7 is supplied to the controller 1 as a TH signal. In the inside processing of the controller 1, an electric power duty to be supplied to the heater RH1 under a PI control, for example is calculated on the basis of the detected temperature of the thermister TH1, the set temperature of the heater RH1 and the current flowing through the heater RH1. The controller 1 converts the electric power duty to be supplied to a control level such as a phase angle (phase control), a wave number (wave number control) or the like, and controls the TRIAC Q3 using the control condition provided by the conversion.

[Control Sequence of Relay]

The description will be made as to the processing (selection process) for selecting a control sequence for the relay RL1 and the relay RL2 by the controller 1, according to this embodiment. The controller 1 is capable of carrying out a relay control sequence operation including a starting sequence and a stopping sequence. The starting sequence is carried out for the relays when the state of the apparatus shifts from the sleeping state to the stand-by state. The stopping sequence is carried out for the relays when the state of the apparatus shifts from the stand-by state to the sleeping state. The relay control sequence in this embodiment includes two sequences, namely a first relay control sequence and a second relay control sequence, and the controller 1 is capable of carrying out the two relay control sequences.

The first relay control sequence includes a first starting sequence and a first stopping sequence. The first starting sequence carries out failure detection for the relay RL1, and renders the relay RL1 On after rendering the relay RL2 On. The first stopping sequence carries out the failure detection for the relay RL1, and renders the relay RL2 Off after rendering the relay RL1 Off.

The second relay control sequence includes a second starting sequence and a second stopping sequence. The second starting sequence carries out failure detection for the relay RL2, and renders the relay RL2 On after rendering the relay RL1 On. The second stopping sequence carries out the failure detection for the relay RL2, and renders the relay RL1 Off after rendering the relay RL2 Off. However, the first relay control sequence may carry out the first starting sequence and the second stopping sequence, and the second relay control sequence may carry out the second starting sequence and the first stopping sequence. However, the above-described combination of this embodiment is advantageous from the standpoint of safety because after arc discharge is produced at the contacts of the relay, the failure of the relay can be detected.

As for a so-called open failure of the relay, that is, incapability of rendering On, the failure can be detected in the normal operation, but as to a so-called short-circuit failure (failure by short-circuit), that is, incapability of rendering Off, the failure cannot be detected without a failure detecting operation. The description of this embodiment will be made as to the method for detecting the short-circuit failure of the relay because the short-circuit failure is concerned with the safety of the image forming apparatus, and in the following description, the failure means the short-circuit failure.

The controller 1 includes the non-volatile memory 1d for storing the relay control sequence carried out. The controller 1 selects the first relay control sequence when the relay control sequence carried out immediately before is the second relay control sequence, on the basis of the information stored in the non-volatile memory 1d. On the other hand, the relay control sequence carried out immediately before is the first relay control sequence, the second relay control sequence is selected.

(First Relay Control Sequence)

FIG. 3 is an illustration of the relay control sequence according to this embodiment. FIG. 3A illustrates the first relay control sequence, and FIG. 3B illustrates the second relay control sequence. Parts (a) of FIGS. 3A and 3B show starting sequences, and parts (b) of FIG. 3B show the stopping sequences. FIGS. 3A and 3B show only the major structures relating to the relay control sequence of the circuit structures shown in FIG. 2.

(First Starting Sequence)

The first starting sequence of the first relay control sequence will be described. In part (a) of FIG. 3A, 3-1-0 means the sleeping state, in which the relay RL1, the relay RL2 and the TRIAC Q3 are in Off state. The controller 1 effects the first starting sequence upon a transition requirement to the stand-by state. By the controller 1 making the Q2 driving signal to the high-level, the relay RL2 is rendered On, and the failure detection for the relay RL1 is enabled (3-1-1, (a) of FIG. 3A). By the controller 1 making the Q4 driving signal to the high-level, the TRIAC Q3 is rendered On (3-1-2, part (a) of FIG. 3A).

Figure 3A:
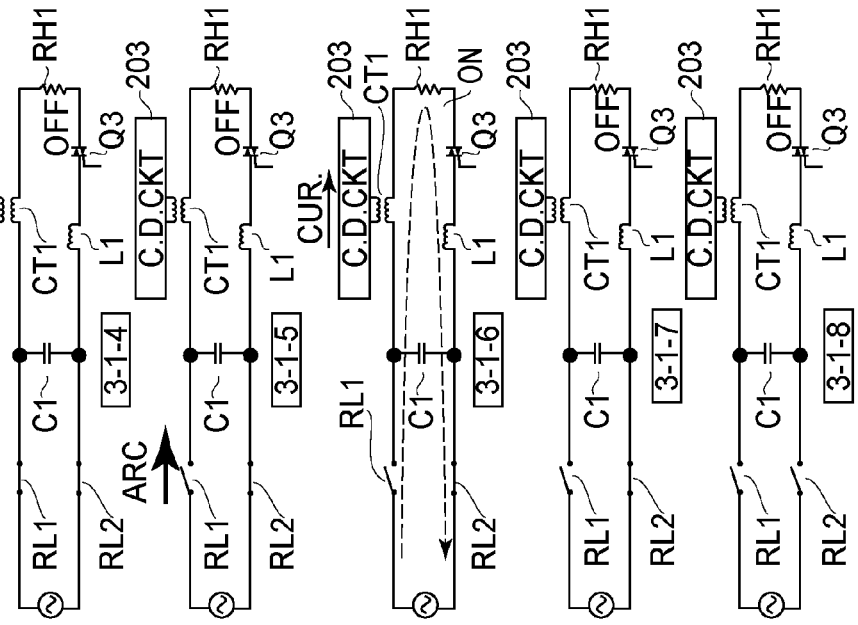
FIGS. 3A and 3B are illustrations of a relay control sequence employed by the electric power supply device of Embodiment 1.
Figure 3A:
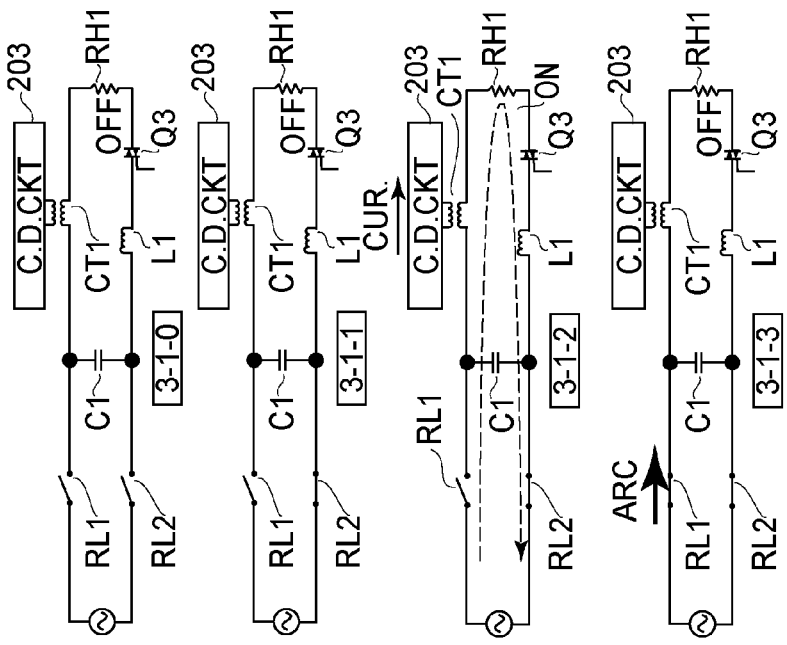
Figure 3B:
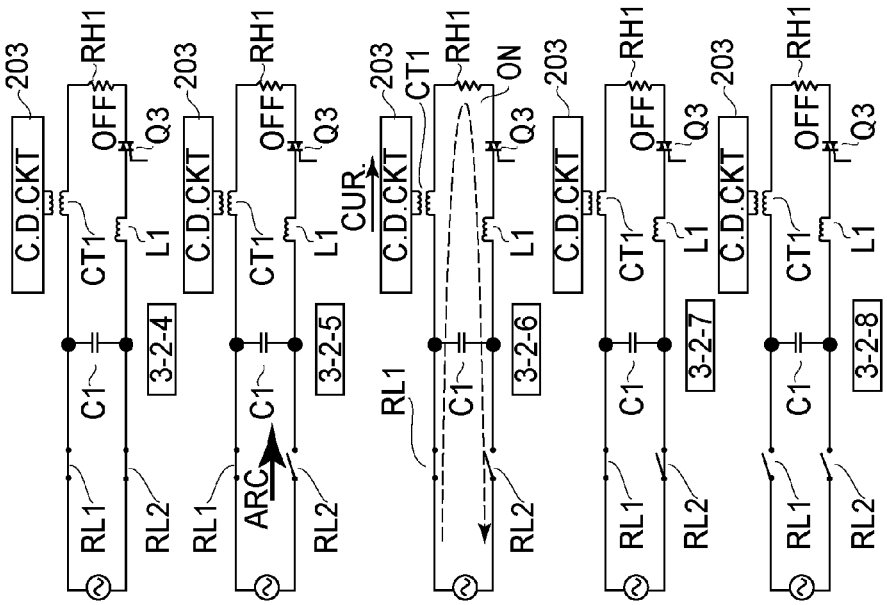
Figure 3B:
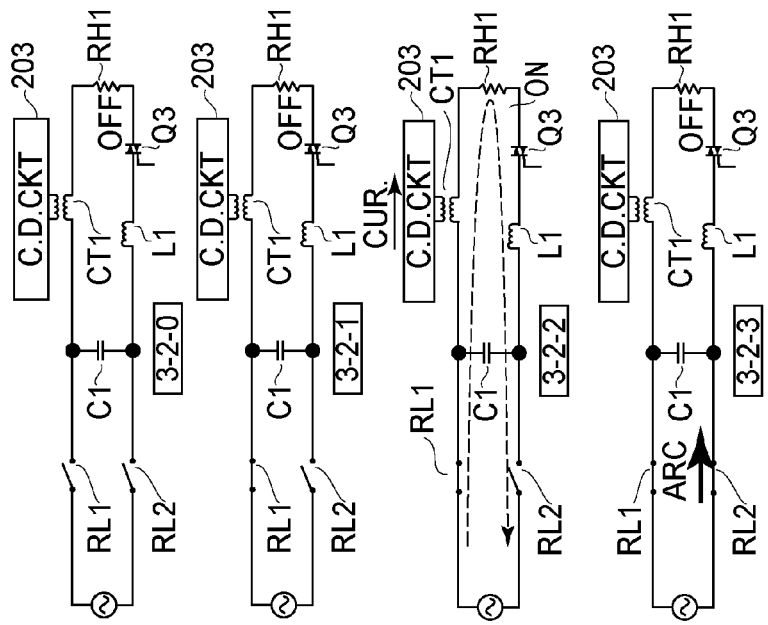

In the state of 3-1-2, the current flowing through the transmission line to the heater RH1 is detected by the current detection circuit 203, by which the failure of the relay RL1 can be detected. More specifically, when the relay RL1 fails, a current path indicated by a broken line in 3-1-2 of part (a) of FIG. 3A is established, and therefore, the current flows through the current transformer CT1. In the state of 3-1-2, when the flow of the current is detected by the current detection circuit 203, the controller 1 discriminates that the relay RL1 fails. Thereafter, the controller 1 makes the driving signal to the low-level, by which the TRIAC Q3 is rendered Off, and then makes the Q2 driving signal to the low-level, by which the relay RL2 is rendered Off, so that the state is as indicated by 3-1-8 of part (b) of FIG. 3A.

In the state of 3-1-2 of part (a) of FIG. 3A, when the current detection circuit 203 detects no current, the controller 1 discriminates that the relay RL1 does not fail. The controller 1 makes the driving signal to the low-level, by which the TRIAC Q3 is rendered Off, and then makes the Q1 driving signal to the high-level, by which the relay RL1 is rendered On, so that the state is as indicated by 3-1-3 (stand-by state) of part (a) of FIG. 3A. At this time, an inrush current flows into the X capacitor C1 with the result of production of the arc discharge at the contacts of the relay RL1, so that the contacts of the relay RL1 receives a stress. Subsequently, when the controller 1 receives the printing command from the user, the state shifts from the stand-by state to the printing state, and the printing operation is carried out.

(First Stopping Sequence)

The first stopping sequence of the first relay control sequence will be described. In part (b) of FIG. 3A, 3-1-4 shows the stand-by state, in which the controller 1 effects the first stopping sequence upon the transition requirement to the sleeping state. By the controller 1 making the Q1 driving signal to the low-level, the relay RL1 is rendered Off, and the failure detection for the relay RL1 is enabled (3-1-5, part (b) of FIG. 3A). At this time, the arc discharge is produced at the contacts of the relay RL1. By the controller 1 making the Q4 driving signal to the high-level, the TRIAC Q3 is rendered On (3-1-6, part (b) of FIG. 3A). In this state, the failure detection for the relay RL1 is carried out, again.

When the failure of the relay RL1 is discriminated on the basis of the current detected by the current detection circuit 203, the controller 1 makes all of the driving signals to the low-level. When the relay RL1 fails, the current flows along the indicated by the broken line. By the controller 1 making all of the driving signals of the transistors to the low-level, the TRIAC Q3, the relay RL1 and the relay RL2 are rendered Off, so that the state becomes as shown in 3-1-8 of part (b) of FIG. 3A. When no failure of the relay RL1 is discriminated, the controller 1 makes the Q4 driving signal to the low-level, so that the TRIAC Q3 is rendered Off, and the state becomes as shown by 3-1-7 of part (b) of FIG. 3A. Thereafter, the controller 1 renders the relay RL2 Off, and the state becomes as indicated by 3-1-8 of part (b) of FIG. 3A.

(Second Relay Control Sequence)

The second relay control sequence will be described. In the second relay control sequence, when the transition requirement to the stand-by state is produced in the sleeping state of 3-2-0 in part (a) of FIG. 3B, the controller 1 effects of the second starting sequence indicated by 3-2-1 or 3-2-3 in part (a) of FIG. 3B. In 3-2-3 of part (a) of FIG. 3B, the arc discharge is produced at the contacts of the relay RL2. In the stand-by state of 3-2-4 of part (b) of FIG. 3B, upon the transition requirement to the sleeping state, the controller 1 carries out the second stopping sequence of 3-2-5 or 3-2-8 of part) of FIG. 3B. In 3-2-5 of part (b) of FIG. 3B, the arc discharge is produced at the contacts of the relay RL2.

In the first relay control sequence, the failure detection for the relay RL1 is carried out, and in the second relay control sequence, the failure detection for the relay RL2 is carried out. As for the failure detecting method for the relay RL2 and the processing when the failure of the relay RL2 is discriminated, the description is omitted because they are similar to those of the first relay control sequence. When the relay RL2 fails, the current flows along the path indicated by a broken line in 3-2-2 of part (a) of FIG. 3B or 3-2-6 of part (b) of FIG. 3B. Furthermore, as shown in 3-2-3 of part (a) of FIG. 3B, in the second relay control sequence, the arc discharge is produced at the contacts of the relay RL2 due to the inrush current to the X capacitor C1, with the result of stress to the contacts of the relay RL2. In this manner, when the failure detection for the relay is carried out, the controller 1 renders the relay to be subjected to the failure detection Off, and renders the relay not to be subjected to the failure detection On. In the starting sequence, the arc discharge is produced at the contacts of such a relay of all the relays that has last been rendered On (the relay having been subjected to the failure detection). In the stopping sequence, the arc discharge is produced at the contacts of such a relay of all the relays that has first been rendered Off.

[Relay Control Process]

Figure 4:
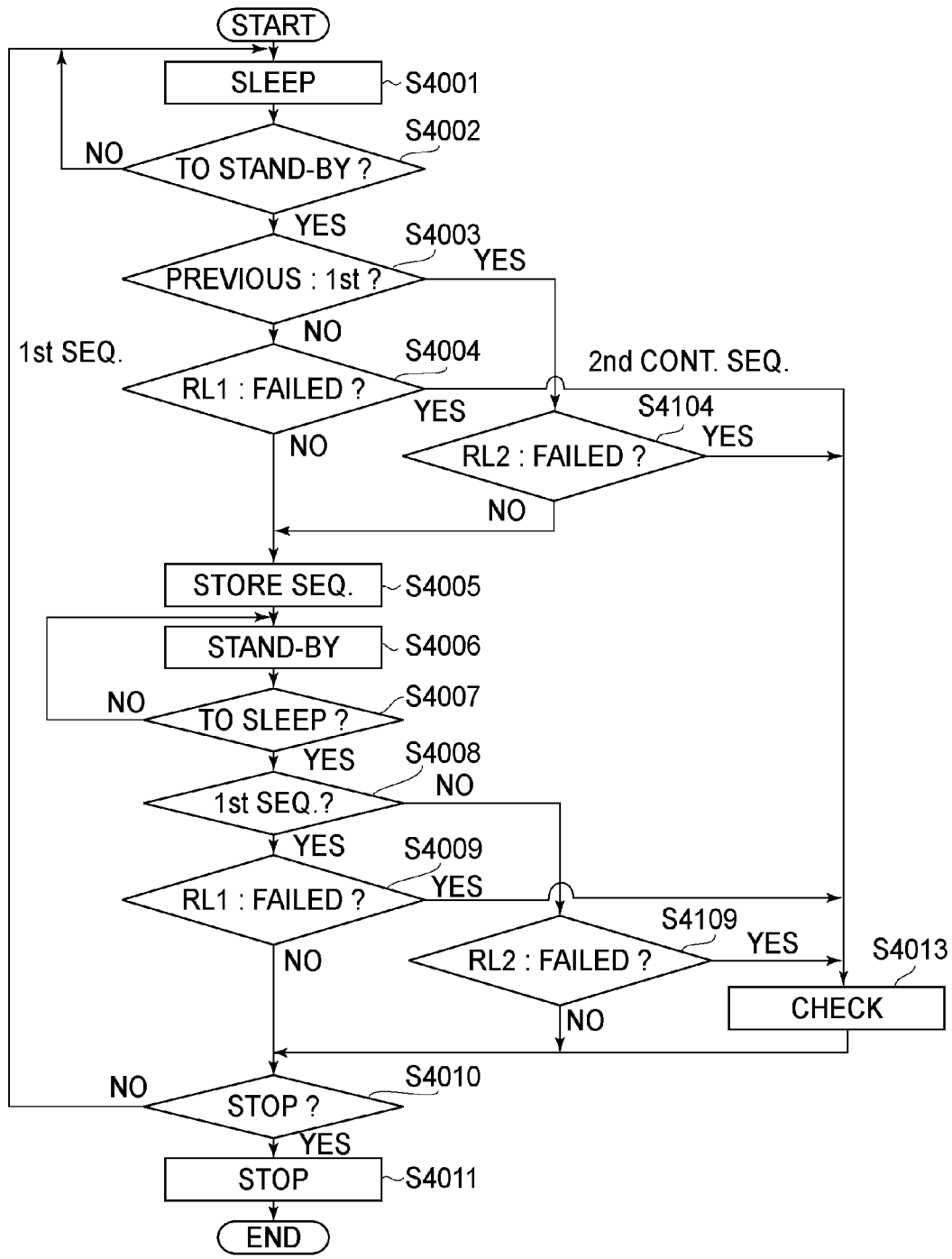
FIG. 4 is a flow chart showing a relay control for the electric power supply device according to Embodiment 1.

FIG. 4 is a flow chart of the relay control sequence by the controller 1, according to this embodiment. A main switch (unshown) is depressed to actuate the voltage source, and initial operations are carried out, and thereafter, the controller 1 starts the steps 4001 and et seqq. In step S4001, the controller 1 places the image forming apparatus 10 in the sleeping state. In step S4002, the controller 1 discriminates as to whether or not a requirement for shifting to the stand-by state (stand-by transition requirement) by the recitation of the signal of the print requirement from the user is produced. If the result of the discrimination in the step S4002 is negative, the operation returns to the step S4001. Thus, the sleeping state of the image forming apparatus 10 is maintained in this period. If the discrimination in the step S4002 is affirmative, the operation proceeds to the step S4003.

In step S4003, the controller 1 discriminates as to whether or not the relay control sequence carried out immediately before (immediately previous, for example) is the first relay control sequence on the basis of the information stored in the non-volatile memory 1d. In this step S4003, if the controller 1 discriminates that the relay control sequence carried out immediately before is the first relay control sequence, the operation proceeds to step S4104. On the other hand, when the relay control sequence carried out immediately before is not the first relay control sequence as discriminated by the controller 1, that is, the controller 1 discriminates that the relay control sequence carried out immediately before is the second relay control sequence, the operation proceeds to step S4004.

In step S4004, the controller 1 carries out the first relay control sequence. That is, in this embodiment, when the previous relay control sequence is the second relay control sequence in which the failure detection is effected for the relay RL2, the relay control sequence is switched to the first relay control sequence in which the failure detection is carried out for the relay RL1. The controller 1 carries out the first starting sequence of the first relay control sequence to discriminate whether or not the relay RL1 fails. When the failure of the relay RL1 is discriminated in the step S4004, the operation proceeds to step S4013. In the step S4013, the controller 1 displays the failure of the relay RL1 on a display screen (unshown) of the apparatus or a display screen of external equipment (personal computer (PC), for example) connected with the apparatus, and the operation proceeds to step S4010. On the other hand, no failure of the relay RL1 is discriminated in the step S4004, the operation procedure to step S4005.

In this step S4104, the controller 1 carries out the second relay control sequence. As described in the foregoing, according to this embodiment, when the previous relay control sequence is the first relay control sequence for detecting the failure of the relay RL1, the relay control sequence is switched to the second relay control sequence for detecting that the failure of the relay RL2. The controller 1 carries out the second starting sequence of the second relay control sequence to discriminate the failure of the relay RL2. When the failure of the relay RL2 is discriminated in the step S4104, the operation proceeds to step S4013. On the other hand, no failure of the relay RL2 is discriminated in the step S4104, the operation procedure to step S4005.

In step S4005, the controller 1 stores in the non-volatile memory 1d the information indicative of the relay control sequence which is being carried out. In step S4006, the controller 1 shifts the image forming apparatus 10 from the sleeping state to the stand-by state (3-1-3 in part (a) of FIG. 3A, 3-2-3 in part (a) of FIG. 3B. When the image forming apparatus 10 shifts to the stand-by state, and the print requirement from the user is produced, the image forming apparatus 10 is shifted from the stand-by state to the printing state, and the controller 1 execute the printing operation.

In step S4007, the controller 1 discriminates whether or not the requirement for shifting the apparatus from the stand-by state to the sleeping state (sleeping transition requirement) is received. In step S4007, if the controller 1 discriminates the reception of the sleeping transition requirement, the operation proceeds to step S4008. In the step S4007, if the controller 1 discriminates no reception of the sleeping transition requirement, the operation returns to the S4006 to continue the stand-by state of the image forming apparatus 10.

In step S4008, the controller 1 looks up the information stored in the non-volatile memory 1d in the step S4005 to discriminate whether the relay control sequence currently carried out is the first relay control sequence or not. If the controller 1 discriminates in the S4008 that the current relay control sequence is the first relay control sequence, the operation proceeds to the step S4009. On the other hand, the controller 1 discriminates in the S4008 that the current relay control sequence is not the first relay control sequence, that is, it is the second relay control sequence, the operation proceeds to step S4109.

In the S4009, the controller 1 carries out the first stopping sequence of the first relay control sequence to discriminate whether or not the relay RL1 fails. When the failure of the relay RL1 is discriminated in the step S4009, the operation proceeds to step S4013. On the other hand, no failure of the relay RL1 is discriminated in the step S4009, the operation procedure to step S4010. In the step S4109, the controller 1 executes of the second stopping sequence of the second relay control sequence to discriminate whether or not the relay RL2 fails. When the failure of the relay RL2 is discriminated in the step S4109, the operation proceeds to step S4013. On the other hand, no failure of the relay RL2 is discriminated in the step S4109, the operation proceeds to step S4010.

In this step S4010, the controller 1 discriminates whether or not a requirement for stopping the image forming apparatus 10 (stop requirement) is produced. If the controller 1 discriminates the production of the image forming apparatus 10 stop requirement by the operation of the user or due to the failure of the relay, the operation proceeds to step S4011. If the controller 1 discriminates no stop requirement of the image forming apparatus 10 in step S4010, the operation returns to the step S4001, that this, the image forming apparatus 10 is shifted from the stand-by state to the sleeping state. In step S4011, the controller 1 stops the image forming apparatus 10 to complete the process, by which the image forming apparatus 10 is rendered Off.

In this manner, in this embodiment, the previously carried out relay control sequence is stored in the non-volatile memory 1d, and the relay control sequence different from the previously carried out relay control sequence is carried out. Thus, when the relay control sequence is carried out, the controller 1 selectively switch is the order of the opening and closing of the relays. In this embodiment, the relay control sequence information is stored in the non-volatile memory 1d only at the timing of the completion of the starting sequence (FIG. 4, S4005). However, it is a possible alternative that the information relating to which starting sequence is carried out is stored in the non-volatile memory 1d at the timing of the completion of the starting sequence, and the information relating to which stopping sequence is carried out is stored in the non-volatile memory 1d at the timing of the completion of the stopping sequence. And, in each of the starting sequence and the stopping sequence, on the basis of the information stored in the non-volatile memory 1d, the starting sequence or the stopping sequence which is different from the stored starting sequence or the stored stopping sequence is executed.

[Other Examples of the Failure Detection for the Relay]

In this embodiment, the failure of the relay is detected by the detection of the current to the heater RH1 using the current detection circuit 203, but the failure detection for the relay is possible by detecting the presence or absence of the voltage applied between the transmission lines for the heater RH1. For example, the failure of the relay can be detected using a voltage detection transformer, the zero-cross detection circuit 204 or the means for detecting the voltage. When, for example, a zero-cross detection circuit 204 is used, one of the relay RL1 and the relay RL2, similarly to the case of the current detection, and the failure detection for the other relay is carried out by the zero-cross detection using the zero-cross signal outputted from the zero-cross detection circuit 204. When the relay for which the failure detection is not carried out is rendered On, and the TRIAC Q3 is rendered On, no voltage is applied between the transmission lines for the heater RH1 if the relay is in order. Therefore, no current flows through the resistor R10, and the zero-cross signal remains at the high-level.

On the other hand, when the relay for which the failure detection is carried out fails, an AC voltage is applied between the transmission lines of the heater RH1. Therefore, when the potential of the neutral line becomes lower than the potential of the live line, the current flows through the resistor R10, so that the zero-cross signal becomes low-level. When the relay fails, the zero-cross signal repeats the high-level and the low-level, and therefore, the controller 1 monitors the zero-cross signal for a period not shorter than one half cycle of the AC voltage. The controller 1 detects the falling edge of the zero-cross signal changing from the high-level to the low-level. In this manner, the controller 1 can discriminate the failure of the relay by detecting the falling edge of the zero-cross signal.

In addition, in this embodiment, the starting sequence and the stopping sequence are carried out in the relay control sequence, and the failure detection for the relay RL1 or the relay RL2 is carried out. However, the similar effects can be provided using the starting sequence and the stopping sequence not carrying out the relay failure detection. In such a case, in the steps of S4004, S4104, S4009 and S4109 in FIG. 4, the controller 1 renders the TRIAC Q3 Off, and carries out the respective starting sequence or the stopping sequence without effecting the failure detection for the relay RL1 or the relay RL2. With such a structure, the order of the opening and closing of the relays can be selectively switched for each activation or deactivation. By doing so, the stress due to the arc discharge produced at the contacts of the relay can be dispersed, and therefore, the effects are similar to those when the failure detection for the relay is effected. Similarly, in the case where the failure detection is carried out in one of the starting sequence and the stopping sequence or in the case where the failure detection is carried out only at the starting or stopping, the stress applied to the contacts of the relay can be dispersed more than in the case where the order of the opening and closing of the relay is not selectively switched.

With the electric power supply device 200 of this embodiment, the first relay control sequence and the second relay control sequence are carried out alternately, and therefore, the relay in which the arc discharge is produced is alternately switched. Therefore, the frequency of the arc discharge production at one relay is reduced, and the stress applied to the relay contact can be reduced, and therefore, the lifetime of the relay can be extended.

In this embodiment, the content of the non-volatile memory 1d storing the information relating to the relay control sequence carried out immediately before is checked. Then, on the basis of the relay control sequence carried out immediately before, the order of the opening and closing or the connection of the first relay and the second relay are alternately controlled. However, the information stored in the non-volatile memory 1d is not limited to the relay control sequence carried out immediately before, but it may be hysteresis within a predetermined range, on the basis of which the control is effected. More particularly, on the basis of a plurality of relay control sequence operations in the past, the relay control sequence to be carried out currently may be determined. In addition, the order of the connections or opening and closing operations of the first relay and the second relay on the basis of the information stored in the non-volatile memory 1d may not necessarily be alternating. For example, the operation situation of the image forming apparatus 10 is discriminated on the basis of the hysteresis content in the predetermined range stored in the hysteresis storing means, the order of the connection or opening and closing of the first relay and the second relay is switched alternately for each predetermined numbers (for each three times, for example).

In the electric power supply device 200 of this embodiment, the failure detection for the relay RL1 is carried out in the first relay control sequence, and the failure detection for the relay RL2 is carried out in the second relay control sequence. Therefore, the number of the relays for which the failure detection is carried out is one, when the image forming apparatus 10 shifts from the sleeping state to the stand-by state or when the image forming apparatus 10 shifts from the stand-by state to the sleeping state. Therefore, the time required for the relay failure detection can be reduced as compared with the case in which the failure detections are carried out for both of the relay RL1 and in the relay RL2. In addition, as compared with the case in which the failure detections are carried out for both of the relay RL1 and in the relay RL2, the number of the actuations of the relay can be reduced, so that the influence of the relay failure detection on the lifetime of the relay can be reduced.

As described in the foregoing, according to this embodiment, the frequency of the arc discharge generation at one relay can be reduced, and therefore, the lifetime of the relay can be extended.

[Embodiment 2]
[Voltage Supply Device]

Figure 5:
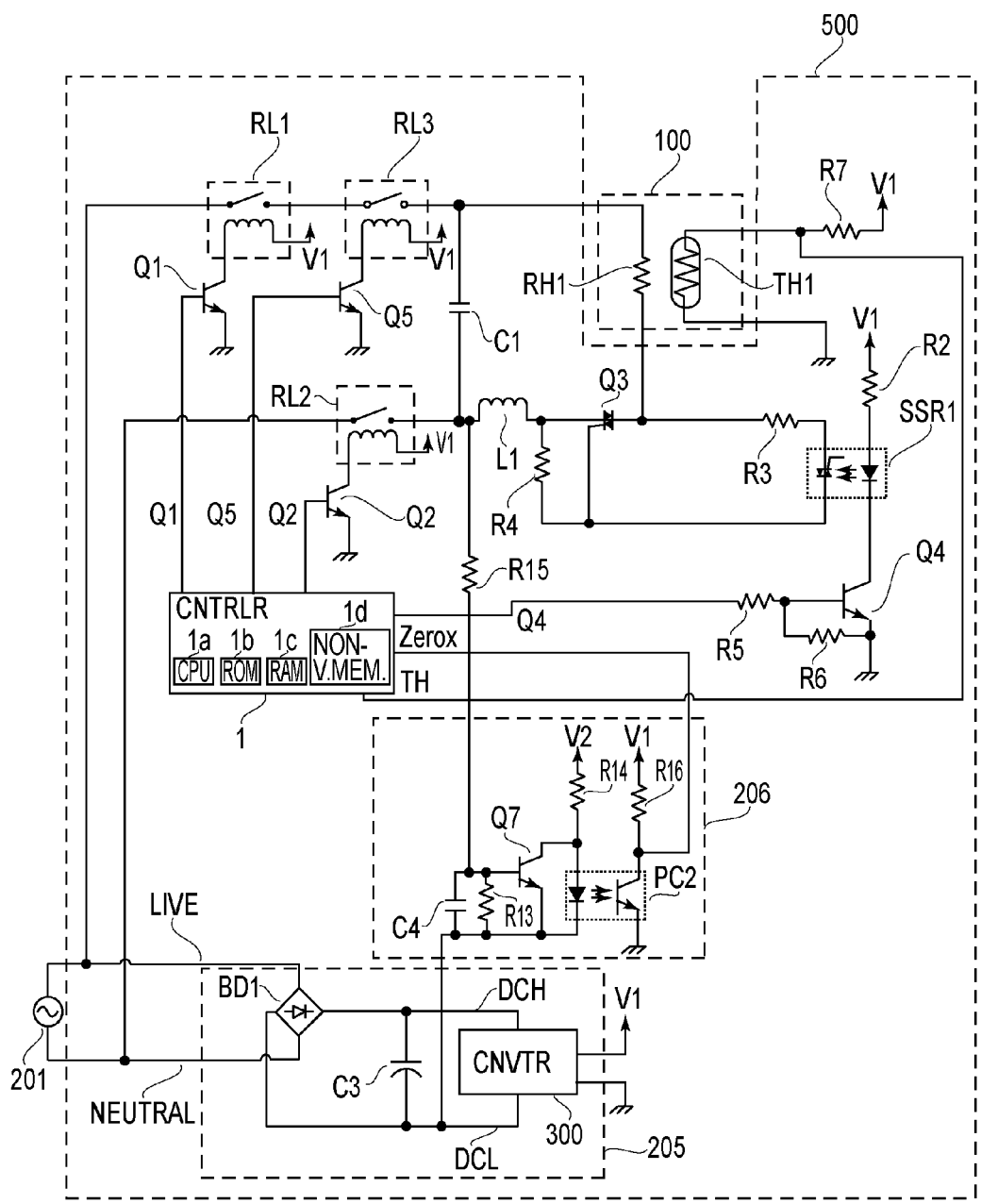
FIG. 5 is a circuit diagram of an electric power supply device according to Embodiment 2.

FIG. 5 is an illustration of the electric power supply device 500 according to Embodiment 2. In the description of this embodiment, the same reference numerals as in Embodiment 1 are assigned to the elements having the corresponding functions in this embodiment, and the detailed description thereof is omitted for simplicity. A relay RL1 (first relay) and a relay RL3 (third relay) are connected in series in a live line which is one of the transmission lines of the AC voltage source 201. By the series connection of the two relays in the single line, it is possible that even when one of the relays is fused or the like, the ON/OFF operation is possible using the other relay. In some cases, the fusing of the relay may be cleared by continuing flow of the current. The description will be made as to the starting or stopping sequence operations of the two relays connected in series according to this embodiment. A transistor Q5 is a driving circuit for the relay RL3 and is controlled by a controller 1.

The transistor Q5 includes a base contact connected with the controller 1, a collector contact connected with the relay RL3 and an emitter contact which is grounded. The controller 1 outputs a high-level or low-level Q5 driving signal to the base contact of the transistor Q5 to control the ON or OFF of the transistor Q5. The relay RL3 may be connected in series with the relay RL2 in the neutral line side.

[Zero-Cross Detection Circuit]

The description will be made as to the zero-cross detection circuit 206 used as zero-cross detecting means for the AC voltage source 201. The zero-cross detection circuit 206 detects the zero-cross point of the AC voltage supplied by the AC voltage source 201. In this embodiment, the zero-cross detection circuit 206 functions also as state detecting means for detecting a potential difference between the transmission lines for the first relay and the second relay, as will be described hereinafter. When the potential of the neutral line supplied from the AC voltage source 201 is higher than the potential of the live line, current flows in the zero-cross detection circuit 206 through the resistor R15. When the current supplied from the resistor R15 flows into the base contact of the transistor Q7 for the zero-cross detection circuit 206, the transistor Q7 is rendered On. The transistor Q7 includes a base contact connected with the resistor R15, a collector contact connected with a primary side of a photo-coupler PC2 and with an anode contact of a diode, and an emitter contact connected with a cathode contact of the primary side diode of the photo-coupler PC2.

The resistor R13 and the capacitor C4 are used for adjustment of the operation timing of the transistor Q7. When the transistor Q7 is rendered On, the voltage applied to the anode contact of the primary side diode of the photo-coupler PC2 lowers, so that the secondary side transistor of the photo-coupler PC2 is rendered Off. When the secondary side transistor of the photo-coupler PC2 is rendered Off, the voltage of the zero-cross signal rises through the pull-up resistance by the DC voltage V1, so that the zero-cross signal becomes high, and the controller 1 detects the rising edge of the zero-cross signal.

When the potential of the neutral line is lower than the potential of the live line, no current flows through the resistor R15, and therefore, the transistor Q7 is rendered Off. When the transistor Q7 is rendered Off, a current flows through the primary side diode of the photo-coupler PC2 by way of the pull-up resistor R14 from the assistance winding line voltage V2 supplied from the assistance winding line (unshown), and therefore, the secondary side transistor of the photo-coupler PC2 is rendered On. When the secondary side transistor of the photo-coupler PC2 is rendered On, the zero-cross signal becomes low, and in the controller 1 detects the falling edge of the zero-cross signal.

[Relay Control Sequence]

A relay control sequence selection process by the controller 1 in this embodiment will be described. The controller 1 carries out the relay control sequence including both of the starting sequence and the stopping sequence. The starting sequence effects the control for the relay when the operator shifts from the sleeping state to the stand-by state. The stopping sequence effects the control for the relay when the apparatus shifts from the stand-by state to the sleeping state. The relay control sequence of this embodiment includes a third relay control sequence, a fourth relay control sequence and a fifth relay control sequence. The third relay control sequence includes a third starting sequence and a third stopping sequence. In the third starting sequence carries out the failure detection for the relay RL1 and renders the relay RL2 and the relay RL3 On and then renders the relay RL1 On. The third stopping sequence carries out the failure detection for the relay RL1 and renders the relay RL1 Off and then renders the relay RL2 and the relay RL3 Off.

The fourth relay control sequence includes a fourth starting sequence and a fourth stopping sequence. The fourth starting sequence carries out the failure detection for the relay RL2 and renders the relay RL1 and the relay RL3 On and then renders the relay RL2 On. The fourth stopping sequence carries out the failure detection for the relay RL2 and renders the relay RL2 Off and then renders the relay RL1 and the relay RL3 Off. The fifth relay control sequence includes a fifth starting sequence and a fifth stopping sequence. The fifth starting sequence carries out the failure detection for the relay RL3 and renders the relay RL1 and the relay RL2 On and then renders the relay RL3 On. The fifth stopping sequence carries out the failure detection for the relay RL3 and renders the relay RL3 Off and then renders the relay RL1 and the relay RL2 Off. By the control of any of the combination of the starting sequence and the stopping sequence, the effects equivalent to those of the Embodiment 1 can be provided.

When the relay control sequence carried out immediately before as is discriminated on the basis of the information stored in the non-volatile memory 1*d* is the fifth relay control sequence, the controller 1 of the electric power supply device 500 selects the third relay control sequence. When the relay control sequence carried out immediately before as is discriminated on the basis of the information stored in the non-volatile memory 1*d* is the third relay control sequence, the controller 1 selects the fourth relay control sequence. When the relay control sequence carried out immediately before as is discriminated on the basis of the information stored in the non-volatile memory 1*d* is the fourth relay control sequence, the controller 1 selects the fifth relay control sequence.

[Relay Control Process]

FIG. 6 is an illustration of the relay control sequence according to this embodiment. FIG. 6A shows the third relay control sequence, FIG. 6B shows the fourth relay control sequence, and FIG. 6C shows the fifth relay control sequence. In each of FIGS. 6A, 6B and 6C, (a) shows the starting sequence, and (b) shows the stopping sequence. FIGS. 6A and 6B show only the major structures relating to the relay control sequence of the circuit structures shown in FIG. 5.

(Third Relay Control Sequence)
(Third Starting Sequence)

Figure 6A:
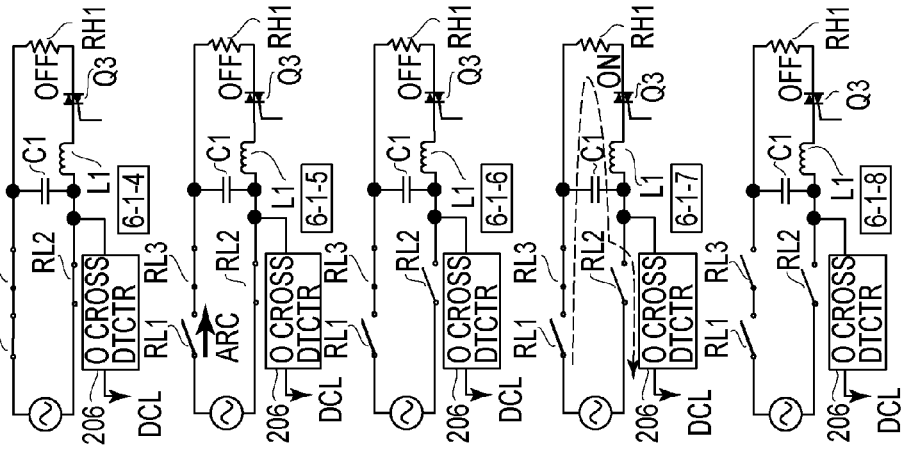
FIGS. 6A, 6B and 6C are illustrations of a relay control sequence employed by the electric power supply device of Embodiment 2.
Figure 6A:
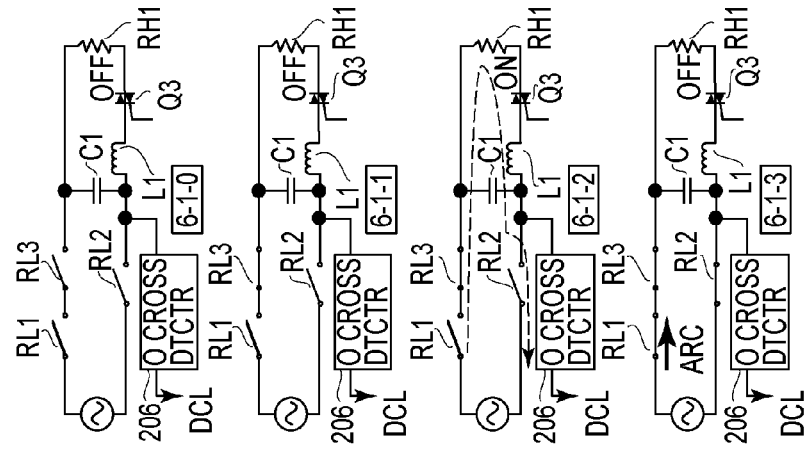

Part (a) of FIG. 6A illustrates the third starting sequence of the third relay control sequence. In part (a) of FIG. 6A, 6-1-0 shows the sleeping state, in which the relay RL1, the relay RL2, the relay RL3 and the TRIAC Q3 are in the Off state. Upon the production of the transition requirement to the stand-by state, the controller 1 carries out the third starting sequence. By the controller 1 making the Q5 driving signal to the high-level, the relay RL3 is rendered On, and the failure detection for the relay RL1 is enabled (6-1-1, (a) of FIG. 6A).

By the controller 1 making the Q4 driving signal to the high-level, the TRIAC Q3 is rendered On (6-1-2, part (a) of FIG. 6A). At this time, on the basis of the zero-cross signal outputted from the zero-cross detection circuit 206, the controller 1 discriminates presence or absence of the failure of the relay RL1. More particularly, when the relay RL1 fails, the current flows along the current path indicated by the broken line of 6-1-2 in part (a) of FIG. 6A. The controller 1 discriminates failure of the relay RL1 on the basis of the state of the output of the zero-cross detection circuit 206 established. When the relay RL1 fails, the controller 1 makes all of the Q1, Q2, Q4 and Q5 driving signal to the low-level so as to render all of the relays and the TRIAC Q3 Off (6-1-8 of part (b) of FIG. 6A).

When no failure of the relay RL1 is discriminated, the controller 1 makes the Q4 driving signal to the low-level so as to render the TRIAC Q3 Off. Thereafter, it makes the driving signal to the high-level, by which the relay RL2 is rendered On, and thereafter, makes the Q1 driving signal to the high-level, by which the relay RL1 is rendered On, thus placing the apparatus in the stand-by state (6-1-3 of part (a) of FIG. 6A. At this time, inrush current flows into the X capacitor C1 with the result of reduction of arc discharge at the contacts of the relay RL1 and the stress to the contacts of the relay RL1. Thereafter, upon the production of the print requirement by the user, the apparatus shifts to the printing state to carry out a printing operation.

(Third Stopping Sequence)

The third stopping sequence of the third relay control sequence will be described. In part (b) of FIG. 6A, 6-1-4 shows the stand-by state, in which upon the transition requirement to the sleeping state, the third stopping sequence is carried out. The controller 1 makes the Q1 driving signal to the low-level, by which the relay RL1 is rendered Off (part (b) of FIG. 6A). At this time, the arc discharge is produced at the contacts of the relay RL1. By the controller 1 making the Q2 driving signal to the low-level, the relay RL2 is rendered Off, and the failure detection for the relay RL1 is enabled (6-1-6, part (b) of FIG. 6A). By the controller 1 making the Q4 driving signal to the high-level, the TRIAC Q3 is rendered On (6-1-7, part (b) of FIG. 6A). In this state, the failure detection for the relay RL1 is carried out, again. When the relay RL1 fails, the current flows along the current path indicated by a broken line of 6-1-7 in part (b) of FIG. 6A.

When the relay RL1 fails, the controller 1 makes all of the Q1, Q2, Q4 and Q5 driving signals to the low-level, so that all of the TRIAC Q3 and the relays are rendered Off (6-1-8 of part (b) of FIG. 6A. When the relay RL1 does not fail, the controller 1 makes the Q4 driving signal to the low-level so as to render the TRIAC Q3 Off. Thereafter, makes the Q5 driving signal to the low-level, so that the relay RL3 is rendered Off (6-1-8 of part (b) of FIG. 6A to shift the apparatus to the sleeping state.

(Fourth Relay Control Sequence)

Figure 6B:
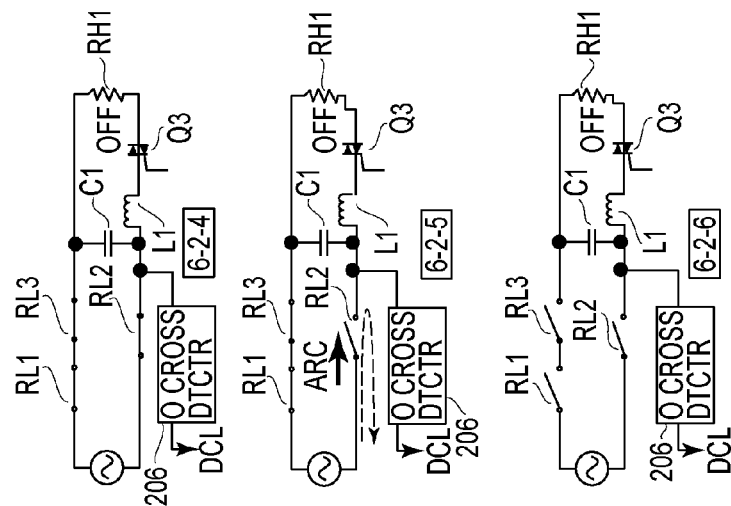
Figure 6B:
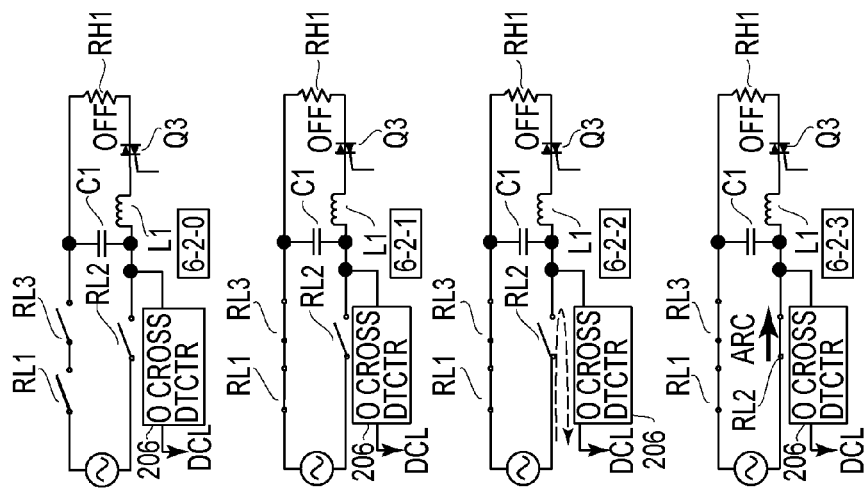

The fourth relay control sequence will be described In the fourth relay control sequence, upon the protection of the transition requirement to the stand-by state in the sleeping state shown by 6-2-0 of part (a) of FIG. 6B, the fourth starting sequence indicated by 6-2-1 or 6-2-3 in part (a) of FIG. 6B is carried out. As shown in 6-2-1 of part (a) of FIG. 6B, the Q1 driving signal renders the relay RL1 On, and the Q5 driving signal renders the relay RL3 On. When the relay RL2 fails, the current flows along the current path indicated by a broken line in 6-2-2 of part (a) of FIG. 6B. When the relay RL2 fails, the current path as shown in the Figure is established even if the TRIAC Q3 is kept in the Off state. When the relay RL2 does not fail, as shown in 6-2-3 of part (a) of FIG. 6B, the controller 1 renders the relay RL2 On by the Q2 driving signal. At this time, the arc discharge is produced at the contacts of the relay RL2.

In the stand-by state shown by 6-2-4 of part (b) of FIG. 6B, upon the production of the transition requirement to the sleeping state, the controller 1 carries out the fourth stopping sequence of 6-2-5 or 6-2-6 of part (b) of FIG. 6B. When the failure detection for the relay RL2 is carried out, the Q2 driving signal renders the relay RL2 Off, as shown in 6-2-5 of part (b) of FIG. 6B. At this time, the arc discharge is produced at the contacts of the relay RL2. When the relay RL2 fails, the current flows along the current path indicated by a broken line of 6-2-5 of part (b) of FIG. 6B. When the relay RL2 fails, the current path as shown in the Figure is established even if the TRIAC Q3 is kept in the Off state. Thus, in the fourth relay control sequence, the failure detection is carried out for the relay RL2, using the zero-cross detection circuit 206.

The process when the failure of the relay RL2 is discriminated is similar to the process of third relay control sequence, and therefore, the description is omitted. In the fourth relay control sequence, as shown in 6-2-3 of part (a) of FIG. 6B, the arc discharge is produced at the contacts of the relay RL2 by the inrush current into the X capacitor C1, with the result of the stress to the contacts of the relay RL2. In the fourth relay control sequence of this embodiment, the failure detection for the relay RL2 is carried out while the relay RL1 and the relay RL3 are in the On state, and this is because the starting sequence of the relay is also effected. As shown in 6-2-2 of part (a) of FIG. 6B and 6-2-5 of part (b) of FIG. 6B, the current path indicated by the broken line does not include the relay RL1 or the relay RL3, and therefore, the failure detection for the relay RL2 can be carried out while the relay RL1 and the relay RL3 are kept in the Off state. The TRIAC Q3 is kept Off throughout the entire process.

(Fifth Relay Control Sequence)

Figure 6C:
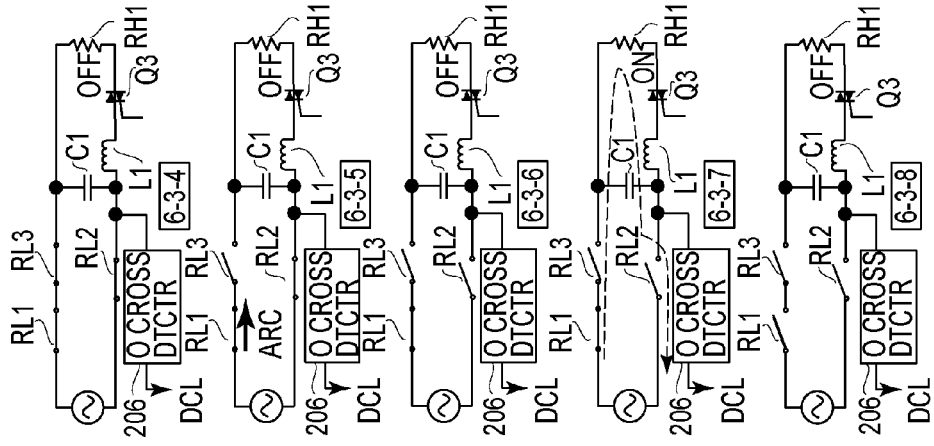
Figure 6C:
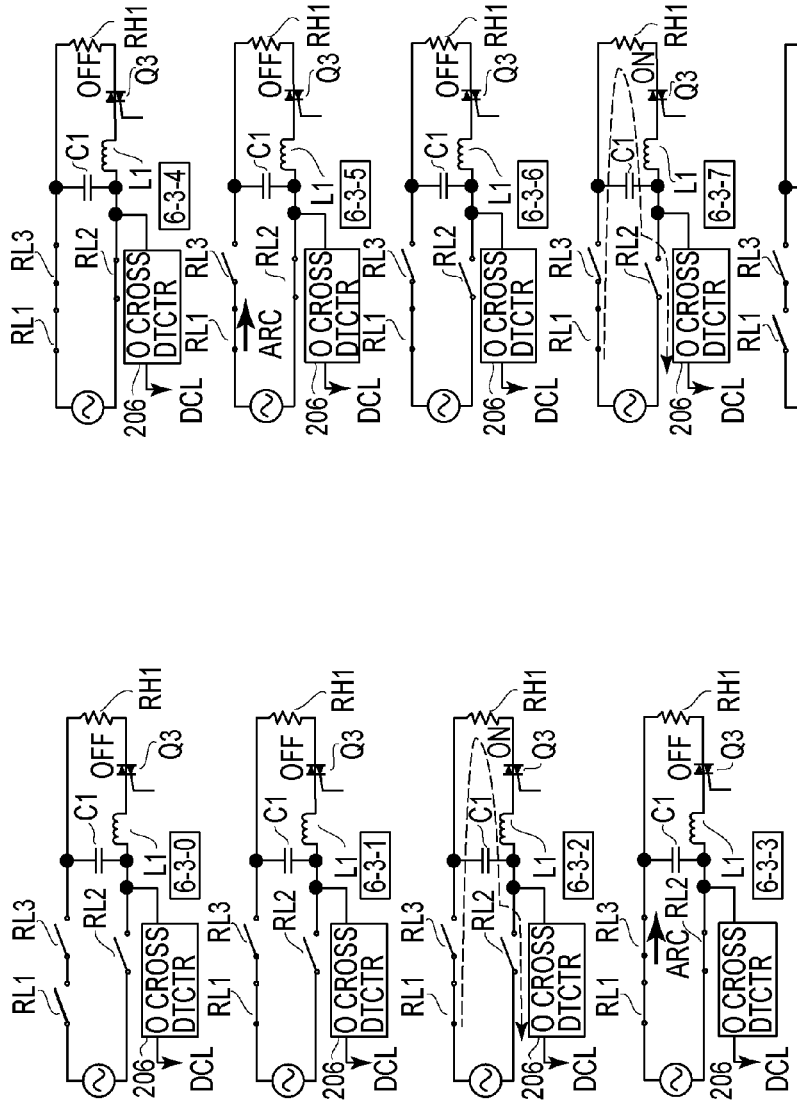

The fifth relay control sequence will be described. In the sleeping state indicated by the 6-3-0 of part (a) of FIG. 6C in the fifth relay control sequence, upon the production of the transition requirement to the stand-by state, the fifth starting sequence indicated by 6-3-1 or 6-3-3 of FIG. 6C is carried out. When the failure detection for the relay RL3 is carried out, the Q1 driving signal renders the relay RL1 On as shown in 6-3-1 of part (a) of FIG. 6C, and the Q4 driving signal renders the TRIAC Q3 On as shown in 6-3-2. When the relay RL3 fails, the current flows along the current path indicated by a broken line of 6-3-2 of part (a) of FIG. 6C.

In addition, when the transition requirement to the sleeping state is produced in the stand-by state shown by 6-3-4 of part (b) of FIG. 6C, the controller 1 carries out the fifth stopping sequence of 6-3-5 or 6-3-8 of part (b) of FIG. 6C. When the failure detection for the relay RL3 is carried out, the Q5 driving signal renders the relay RL3 Off, as shown in 6-3-5 of part (b) of FIG. 6C. At this time, the arc discharge is produced at the contacts of the relay RL3. In addition, as shown in 6-3-6, the Q2 driving signal renders the relay RL2 Off. Furthermore, as shown in 6-3-7 of part (b) of FIG. 6C, the Q4 driving signal renders the TRIAC Q3 On. The failure detecting method for the relay RL3 and the process when the failure of the relay RL3 is discriminated are similar to those of the third relay control sequence, and therefore, the description is omitted. In the fifth relay control sequence, as shown in 6-3-3 of part (a) of FIG. 6C, the arc discharge is produced at the contacts of the relay RL3 by the inrush current into the X capacitor C1 with the result of the stress to the contacts of the relay RL3.

[Selection Process of Relay Control]

Figure 7:
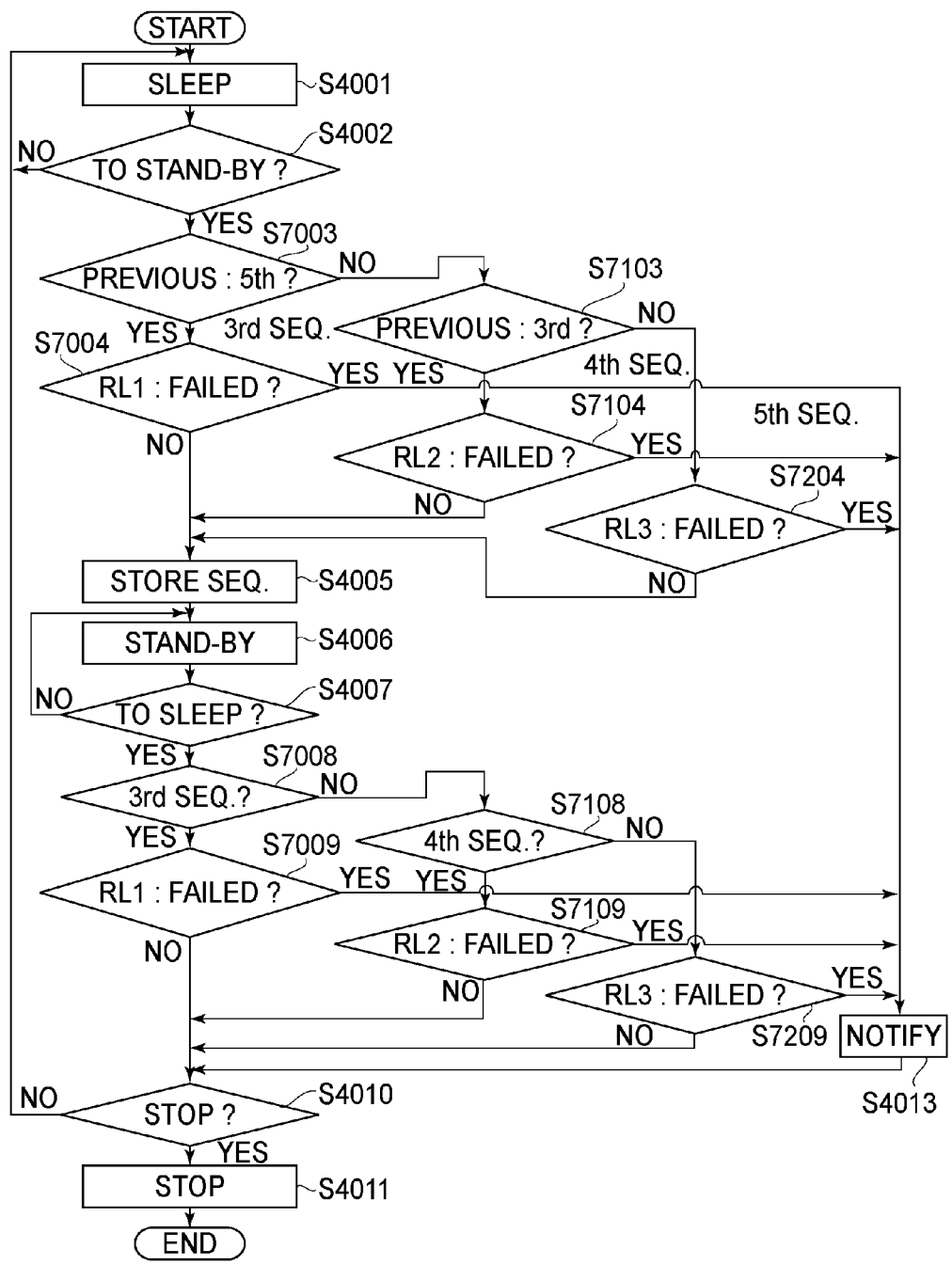
FIG. 7 is a flow chart showing a relay control for the electric power supply device according to Embodiment 2.

FIG. 7 is a flow chart illustrating the relay control sequence of this embodiment by the controller 1. In the description of this embodiment, the same reference step numerals as in Embodiment 1 are assigned to the steps having the corresponding functions in this embodiment, and the detailed description thereof is omitted for simplicity. If the discrimination in the step S4002 is affirmative, the operation proceeds to the step S4003. In step S7003, the controller 1 discriminates whether or not the relay control sequence carried out immediately before as is discriminated on the basis of the information stored in the non-volatile memory 1*d* is the fifth relay control sequence. If the result of the discrimination in the S7003 is negative, the process proceeds to a step S7103. If the result of the discrimination in the S7003 is affirmative, the process proceeds to a step S7004.

In the step S7103, the controller 1 discriminates whether or not the relay control sequence carried out immediately before as is this cremated on the basis of the information stored in the non-volatile memory 1*d* is the third relay control sequence. If the result of discrimination in the state S7103 is affirmative, the process proceeds to a step S7104. If the result of discrimination in the S7103 is negative, the process proceeds to a step S7204. In this step S7004, the controller 1 execute the third starting sequence to effect the failure detection for the relay RL1, that is, the failure of the relay RL1 is checked. When the failure of the relay RL1 is discriminated in the step S7004, the operation proceeds to step S4013. On the other hand, the controller 1 discriminates no failure of the relay RL1, the process proceeds to the step S4005.

In the step S7104, the controller 1 executes the fourth starting sequence to effect the failure detection for the relay RL2 to check the relay RL2. When the failure of the relay RL1 is discriminated in the step S7104, the operation proceeds to step S4013. On the other hand, the controller 1 discriminate no failure of the relay RL2, the process proceeds to the step S4005. In the step S7204, the controller 1 executes the fifth starting sequence to effect the failure detection for the relay RL3 to check the relay RL3. When the failure of the relay RL3 is discriminated in the step S7204, the operation proceeds to step S4013. On the other hand, the controller 1 discriminate no failure of the relay RL3, the process proceeds to the step S4005.

In the step S7008 in which the apparatus shifts from the stand-by state to the sleeping state, the controller 1 discriminates whether or not the currently executing relay control sequence stored in the non-volatile memory 1*d* in the step S4005 is the third relay control sequence. If the result of discrimination in the step S7008 is affirmative, the operation proceeds to the step S7009, and if the result is negative, the operation proceeds to a step S7108. In the step S7108, the controller 1 discriminates whether or not the currently executing relay control sequence is the fourth relay control sequence. If the result of the discrimination in the step S7108 is affirmative, the operation proceeds to the step S7109, and the result is negative, the operation proceeds to the step S7209.

In the step S7009, the controller 1 executes the third stopping sequence to effect the failure detection for the relay RL1 to check the relay RL1. In the step S7009, if the controller 1 discriminates the failure of the relay RL1, the operation proceeds to the step S4013. If the controller 1 discriminates no failure of the relay RL1 in the step S7009, the operation proceeds to the step S4010. In the step S7109, the controller 1 executes the fourth stopping sequence to effect the failure detection for the relay RL2 to check the relay RL2. If the controller 1 discriminates the failure of the relay RL2 in the step S7109, the operation proceeds to the step S4013, and if it discriminates no failure of the relay RL2, the operation proceeds to the step S4010. In the step S7209, the controller 1 executes the fifth stopping sequence to effect the failure detection for the relay RL3 to check the relay RL3. If the controller 1 discriminates the failure of the relay RL3 in the step S7209, the operation proceeds to the step S4013, and if it discriminates no failure of the relay RL3, the operation proceeds to the step S4010.

As described in the foregoing, according to this embodiment, a combination of three relays are used, and therefore, the frequency of the production of the arc discharge at the contacts of the relay is dispersed to these relays, so that the stresses applied to the contacts of the relays are smaller than in the case of using two relays. Therefore, further extension of the lifetime of the relay can be expected. The numbers and the connection types of the Embodiment 1 and Embodiment 2 are examples and are not limited to those of these examples. The structures of this embodiment are applicable when the live side and the neutral side of the transmission lines to the load device from the commercial voltage source include at least one first relay and second relay. By the combination of the relay control sequence, the stress attributable to the arc discharge produced at the contacts of the relay can be dispersed and therefore reduced irrespective of the specific types of the embodiments. Similarly to Embodiment 1, the failure detecting operation for each relay may not be carried out in the relay control sequence. In such a case, the TRIAC Q3 is kept in the Off state.

As described in the foregoing, according to the embodiment, the frequency of the arc discharge generation at one relay can be reduced, and therefore, the lifetime of the relay can be extended.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-197108 filed on Sep. 26, 2014, which is hereby incorporated by reference herein in its entirety.

What is claimed is:

1. An electric power supply device for supplying electric power to a load, said electric power supply device comprising:
    at least one first relay connected with a live line of an alternating-current voltage source;
    at least one second relay connected with a neutral line of the alternating-current voltage source;
    a controller for executing a stopping sequence for rendering Off said first relay and said second relay from On state; and
    a storing portion for storing information relating to the stopping sequence executed by said controller, said stopping sequence includes a first stopping sequence in which said first relay is rendered Off, and then said second relay is rendered Off, and a second stopping sequence in which said second relay is rendered Off, and then said first relay is rendered Off,
    wherein when said controller discriminates whether or not the first relay and the second relay fail, said controller executes the second stopping sequence if the storing portion has stored the information relating to the first stopping sequence for a previous stopping sequence.

2. A device according to claim 1, wherein when said electric power supply device is stopped, said controller executes the first stopping sequence if the storing portion stores the information relating to the second stopping sequence.

3. A device according to claim 1, wherein said controller effects failure detection for said first relay in the first stopping sequence and effects failure detection for said second relay in the second stopping sequence.

4. A device according to claim 1, further comprising,
    a supply portion for supplying electric power to the load, and
    a detecting portion for detecting failure of said first relay or said second relay,
    wherein said detecting portion includes a current detector for detecting a current flowing through the load, a voltage detection portion for detecting a voltage applied to the load, or a zero-cross detection portion for detecting a zero-cross point of an alternating-current voltage of the alternating-current voltage source.

5. A device according to claim 3, further comprising,
    a supply portion for supplying electric power to the load, and
    a detecting portion for detecting failure of said first relay or said second relay,
    wherein said detecting portion includes a current detector for detecting a current flowing through the load, a voltage detection portion for detecting a voltage applied to the load, or a zero-cross detection portion for detecting a zero-cross point of an alternating-current voltage of the alternating-current voltage source.

6. An image forming apparatus comprising: an image forming station for forming an image on a recording sheet;
    a fixing portion for fixing the image formed on the recording sheet by said image forming station on the recording sheet;
    an electric power supply device for supplying electric power to said fixing portion;
    said electric power supply device including,
    at least one first relay connected with a live line of an alternating-current voltage source;
    at least one second relay connected with a neutral line of the alternating-current voltage source;
    a controller for executing a stopping sequence for rendering Off said first relay and said second relay from On state; and
    a storing portion for storing information relating to the stopping sequence executed by said controller, said stopping sequence includes a first stopping sequence in which said first relay is rendered Off, and then said second relay is rendered Off, and a second stopping sequence in which said second relay is rendered Off, and then said first relay is rendered Off,
    wherein when said controller discriminates whether or not the first relay and the second relay fail, said controller executes the second stopping sequence if the storing portion has stored the information relating to the first stopping sequence for a previous stopping sequence.

7. An apparatus according to claim 6, wherein said controller executes the stopping sequence when a state of said apparatus shifts from a stand-by state to a sleeping state which consumes less electric energy than in the stand-by state, the stand-by state waiting for shifting to a printing state for effecting image forming operation by said image forming station.

* * * * *